(12) United States Patent
Ognibene

(10) Patent No.: US 10,408,708 B2
(45) Date of Patent: Sep. 10, 2019

(54) METHOD FOR DETECTING A RECIPROCAL POSITION BETWEEN A CYLINDER AND A PISTON OF A PISTON-CYLINDER UNIT AND A RELATIVE PISTON-CYLINDER UNIT

(71) Applicant: OGNIBENE POWER S.P.A., Reggio Emilia (IT)

(72) Inventor: Claudio Ognibene, Reggio Emilia (IT)

(73) Assignee: OGNIBENE POWER S.P.A., Reggio Emilia (IT)

( * ) Notice: Subject to any disclaimer, the term of this patent is extended or adjusted under 35 U.S.C. 154(b) by 164 days.

(21) Appl. No.: 15/620,328

(22) Filed: Jun. 12, 2017

(65) Prior Publication Data

US 2017/0363512 A1     Dec. 21, 2017

(30) Foreign Application Priority Data

Jun. 21, 2016    (IT) ........................ 102016000063870

(51) Int. Cl.
| | |
|---|---|
| *G01M 15/06* | (2006.01) |
| *G01D 5/26* | (2006.01) |
| *B62D 5/12* | (2006.01) |
| *B62D 15/02* | (2006.01) |
| *F15B 15/28* | (2006.01) |

(Continued)

(52) U.S. Cl.
CPC ............... *G01M 15/06* (2013.01); *B62D 5/12* (2013.01); *B62D 15/0225* (2013.01); *F15B 15/2846* (2013.01); *F15B 15/2876* (2013.01); *F15B 19/005* (2013.01); *G01D 3/10* (2013.01); *G01D 5/26* (2013.01); *G01D 5/34746* (2013.01); *F15B 2211/7054* (2013.01); *F15B 2211/864* (2013.01); *F15B 2211/87* (2013.01)

(58) Field of Classification Search
USPC .............................. 73/114.26, 114.27, 114.28
See application file for complete search history.

(56) References Cited

U.S. PATENT DOCUMENTS

| | | | |
|---|---|---|---|
| 2003/0010192 A1* | 1/2003 | Rollgardh | F15B 15/2807 91/1 |
| 2017/0074296 A1* | 3/2017 | Schwab | F15B 15/1457 |

(Continued)

FOREIGN PATENT DOCUMENTS

| | | |
|---|---|---|
| DE | 102010060550 A1 | 5/2012 |
| EP | 2647967 A2 | 10/2013 |
| WO | 2014118709 A2 | 8/2014 |

OTHER PUBLICATIONS

Extended European Search Report issued in corresponding application, dated Oct. 25, 2017, EP 17 17 5434.

*Primary Examiner* — Eric S. McCall

(74) *Attorney, Agent, or Firm* — Volpe and Koenig, P.C.

(57) ABSTRACT

A method is provided for detecting a reciprocal position between a cylinder and a piston of a piston-cylinder unit of a vehicle. The method includes measuring, by means of an optical sensor, a value of an indicative parameter of a color of a reference mark positioned on a portion of the piston. The method also includes comparing the measured value with at least a predetermined threshold value thereof different to a minimum detected threshold of the indicative parameter by the optical sensor; and
emitting an alarm signal perceptible by a driver of a vehicle if the measured value is comprised between the threshold value and the minimum value.

9 Claims, 4 Drawing Sheets

(51) Int. Cl.
*F15B 19/00* (2006.01)
*G01D 3/10* (2006.01)
*G01D 5/347* (2006.01)

(56) References Cited

U.S. PATENT DOCUMENTS

2017/0328387 A1* 11/2017 Pryssander ......... F15B 15/2846
2018/0120437 A1* 5/2018 Webster ................... G01D 5/30

* cited by examiner

METHOD FOR DETECTING A RECIPROCAL POSITION BETWEEN A CYLINDER AND A PISTON OF A PISTON-CYLINDER UNIT AND A RELATIVE PISTON-CYLINDER UNIT

TECHNICAL FIELD

The present invention relates to a method for detecting a reciprocal position between a cylinder and a piston of a piston-cylinder unit and a relative piston-cylinder unit, for example hydraulic or pneumatic, applied in the automotive sector and a relative piston-cylinder unit.

BACKGROUND

Piston-cylinder units are known which, with the aims of making the reciprocal position between a cylinder and the respective piston translatable therein recognizable, equip the stem solidly constrained to the piston, for example made of steel, with one or more reference marks that are detectable by suitable optical sensors provided on the cylinder. In greater detail, each reference mark is typically obtained on the surface of the stem of the piston, for example by means of laser machining, defining a zone of a dark color (for example black) which contrasts with the rest of the surface of the stem, typically metallic and light-colored.

A much-lamented problem for the piston-cylinder units lies in the fact that the reference mark, with the use of the piston, for example by mechanical wear, tends to lighten, and in particular tends to reduce the chromatic contrast existing between the reference mark and the surrounding surface of the stem, effectively making the reference mark illegible to the sensor, as the contrast is less than the minimum threshold of detectability of the sensor, which thus will no longer find the position established as the reference mark (for example the centered position of the piston with respect to the cylinder).

A method and a piston-cylinder unit of known type are described in international patent application no. WO 2014 118709. The method and the piston-cylinder unit described in the above-described patent application propose to resolve the above-cited drawback making the minimum threshold of the sensor variable according to wear. In practice, the patent application proposes progressively varying the detection threshold of the sensor as the reference mark progressively loses color.

However, this solution leads to the onset of further problems, among which the fact that by continually varying the detection threshold of the sensor, the sensor will detect, as the established position, any point of the stem of the piston that has a contrast with the progressively lighter surface of the stem, i.e. equal to the updated threshold value.

In practice this solution increases the risk of identification of false positives, i.e. signaling of positions which should correspond to the established reference position, but which in reality vary therefrom.

For example, a wrong positioning signal of the piston of the centered position thereof might occur even in very different positions from the effective centered position.

This means, for example in the case of a piston-cylinder unit adopted for guiding steering axes, that the blocking of the steering can be enabled in a false centered position, in which for example the wheels are not straight but steered, with consequent predictable drawbacks of poor maneuverability and poor vehicle safety.

An aim of the present invention is to obviate the above-mentioned drawbacks of the prior art, with a solution that is simple, rational and relatively inexpensive.

The aims are attained by the characteristics of the invention as reported in the independent claim. The dependent claims delineate preferred and/or particularly advantageous aspects of the invention.

SUMMARY

The invention in particular discloses a method for detecting a reciprocal position between a cylinder and a piston of a piston-cylinder unit of a vehicle, in which the method comprises steps of:
  measuring, by means of an optical sensor, a value of an indicative parameter of a color of a reference mark positioned on a portion of the piston;
  comparing the measured value with at least a predetermined threshold value thereof different to a minimum detected threshold of the indicative parameter by the optical sensor; and
  emitting an alarm signal perceptible by a driver of a vehicle if the measured value is comprised between the threshold value and the minimum value.

With this solution, the detecting threshold of the sensor is not modified and the driver can be advised, as long as the piston-cylinder unit is still functioning correctly, that the time is approaching when the optical sensor will no longer be able to correctly detect the presence of the reference mark, enabling the driver to take the due precautions and enact solutions, for example by appropriately taking the vehicle to a service center.

In an aspect of the invention, the method further comprises steps of:
  estimating a time of use or a number of residual strokes of the piston-cylinder unit following the emitting of the alarm signal; and
  including in an alarm signal a scalar magnitude indicative of the time of use or of a residual number of strokes.

With this solution, a good approximation can be made of the moment when the information deriving from the optical sensor will no longer be representative of the real position of the reference mark with respect to the cylinder, i.e. the real centering of the piston, and therefore it is possible to prevent and avoid the vehicle or piston-cylinder unit from working in unsafe conditions for the driver.

The alarm signal can advantageously be a sensor signal, for example visual and/or acoustic and/or tactile, emitted by a user interface, for example located in a command compartment of the vehicle.

For the same aims and advantages, the invention also discloses a piston-cylinder unit of a vehicle, provided with a cylinder, a piston and an electronic control unit configured for:
  measuring, by means of an optical sensor, a value of an indicative parameter of a color of a reference mark positioned on a portion of the piston;
  comparing the measured value with a predetermined threshold value thereof different to a minimum detected threshold of the indicative parameter by the optical sensor; and
  emitting an alarm signal perceptible by a driver of a vehicle if the measured value is comprised between the threshold value and the minimum value.

The electronic control unit can advantageously be configured for:

estimating a time of use or a number of residual strokes of the piston-cylinder unit following the emitting of the alarm signal; and including in an alarm signal a scalar magnitude indicative of the time of use or of a residual number of strokes.

The optical sensor is preferably fixed to the cylinder and, for example, the reference mark is positioned on a stem of the piston able to project axially from the cylinder.

BRIEF DESCRIPTION OF THE DRAWINGS

Further characteristics and advantages of the invention will emerge from a reading of the following description, provided by way of non-limiting example with the aid of the figures illustrated in the appended tables of drawings.

DETAILED DESCRIPTION OF THE PREFERRED EMBODIMENTS

Figure 1:
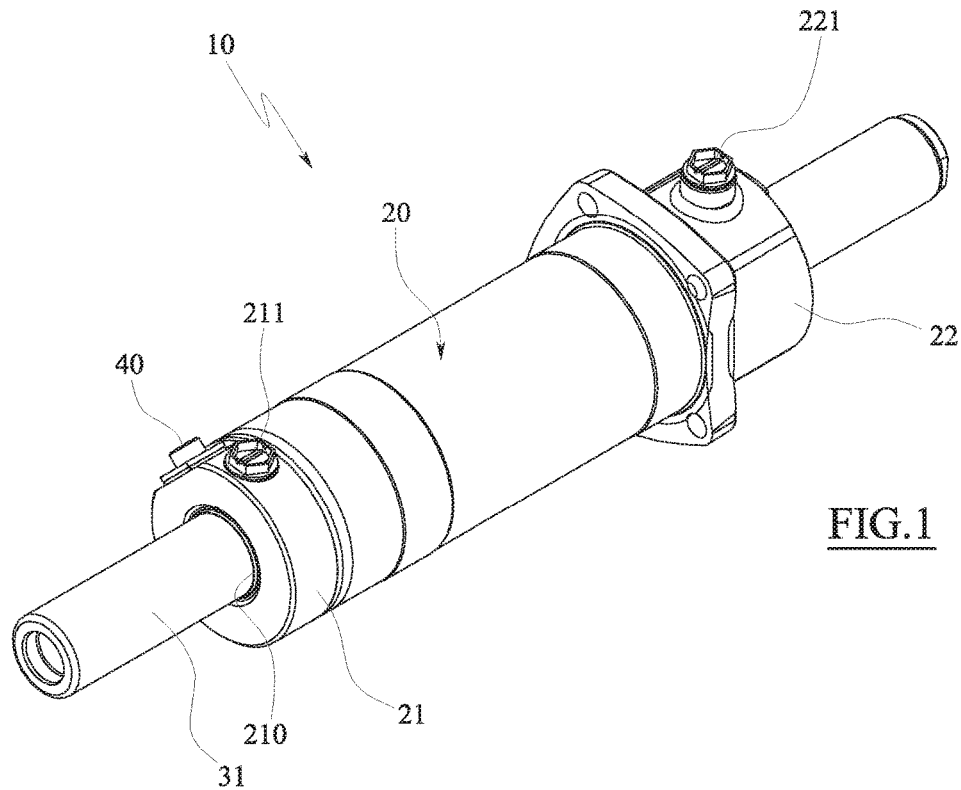
FIG. 1 is an axonometric view of a piston-cylinder unit according to the invention.
Figure 2:
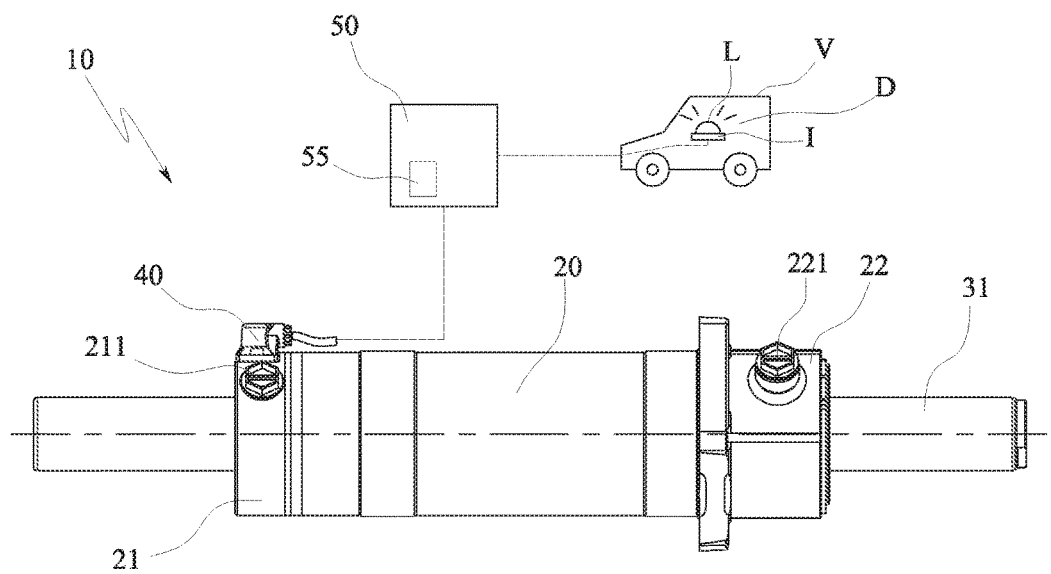
FIG. 2 is a lateral view of FIG. 1.
Figure 3:
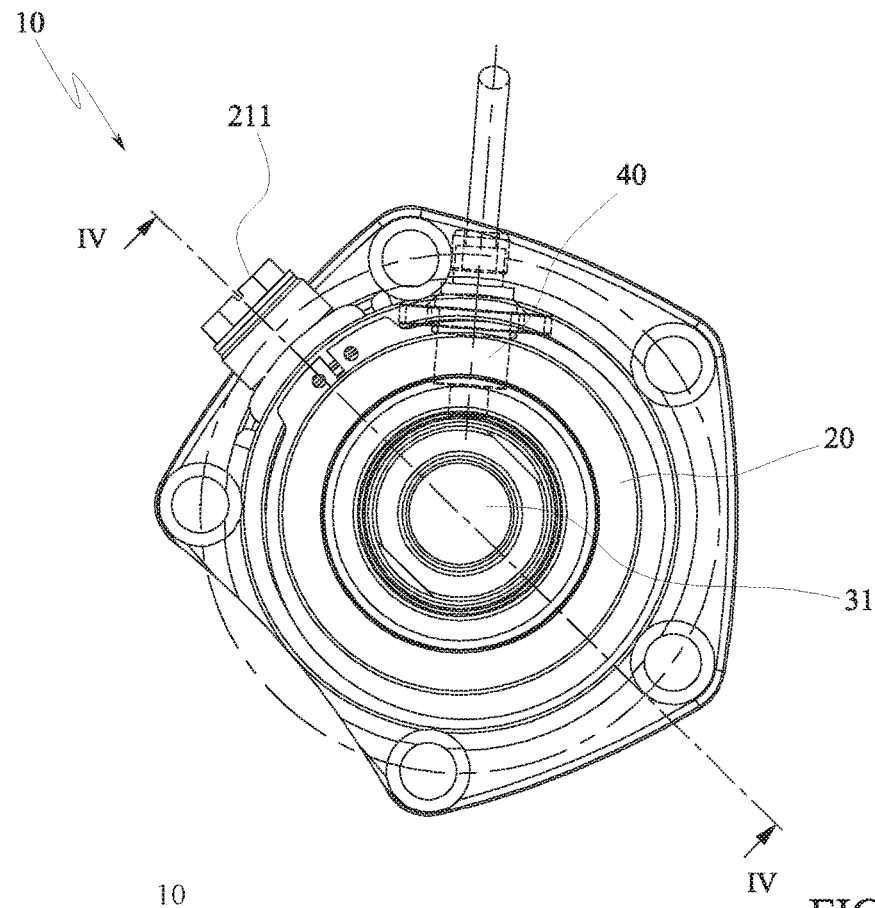
FIG. 3 is a front view of FIG. 1.
Figure 4:
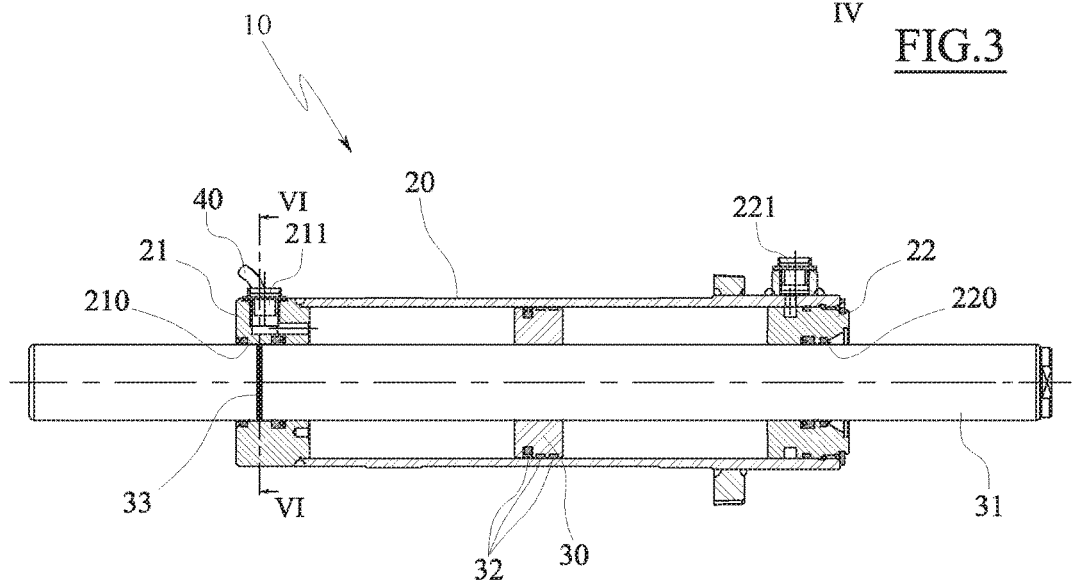
FIG. 4 is a section view along section line IV-IV of FIG. 3.
Figure 5:
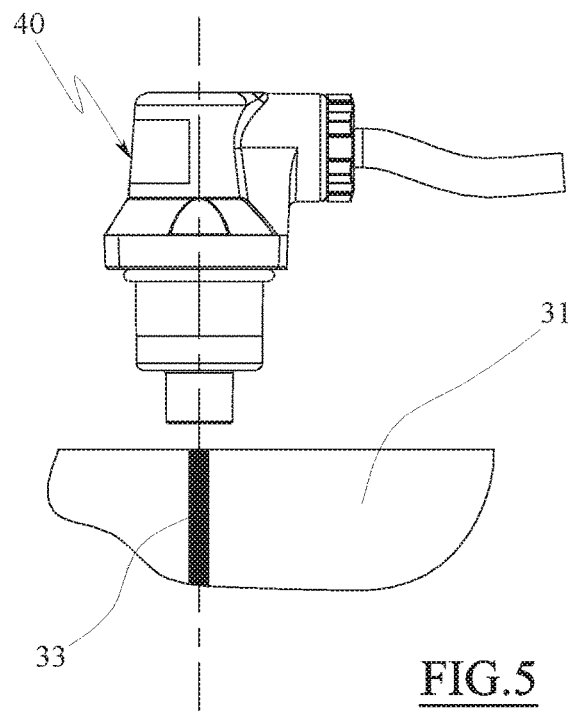
FIG. 5 is a view of a detail of FIG. 2.
Figure 6:
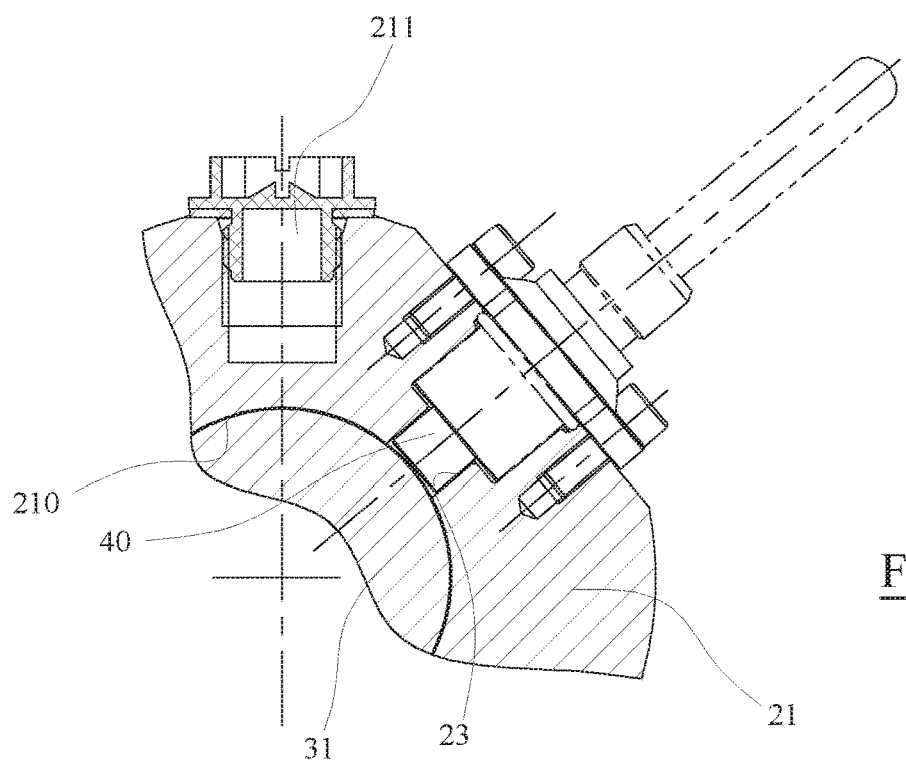
FIG. 6 is a section view along section line VI-VI of FIG. 4.
Figure 7:
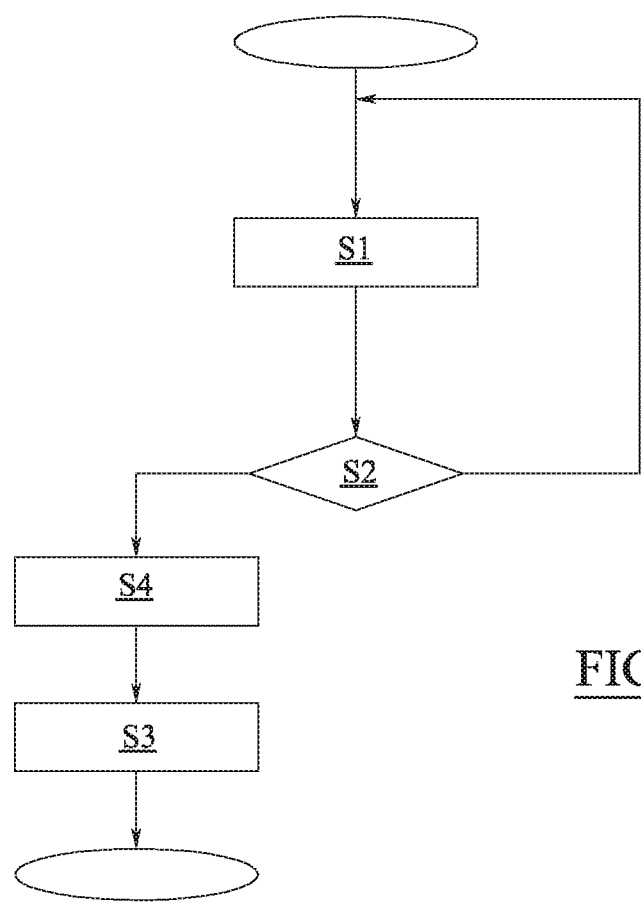
FIG. 7 is a flow chart of a method for detecting a reciprocal position between a cylinder and a piston of a piston-cylinder unit according to the invention.

With particular reference to these figures, reference numeral 10 denotes in its entirety a piston-cylinder unit, for example a piston-cylinder unit able to be used in the automotive sector, for example in a vehicle V.

For example, the piston-cylinder unit 10 is suitable for being mounted, as known to the technical expert in the sector, in an axle (not illustrated), for example a drive axle, i.e. provided with steerable wheels.

The vehicle V further comprises a command compartment D, in which a driver is housed, which is provided with a user interface I provided with a signalling element L, for example a display or one or more LEDs, which is able to emit a visual and/or acoustic signal perceptible by the driver present in the command compartment D of the vehicle V.

In the example, the piston-cylinder unit 10 is of a double-acting type.

The piston-cylinder unit 10 comprises a cylinder 20, having a tubular body, for example having a circular transversal section, which is closed at the opposite ends thereof by respective head walls 21 and 22.

Each head wall 21 and 22 has a respective through-opening 210 and 220, for example having a circular section.

A piston 30 is housed in the cylinder 20, translatably along the longitudinal axis thereof, to which is fixed (rigidly connected) a stem 31 which exits from the cylinder, through (one or) both of the through-openings 210 and 220 of the head walls 21 and 22, for example by means of an interposing of seal element, such as for example seal rings and/or scraper elements or the like.

The piston 30 is, for example, defined by a disc-shaped body the external diameter of which is slightly smaller than the internal diameter of the cylinder 20, so as to slide substantially snugly internally thereof.

Further, the piston 30 can comprise one or more annular seal rings 32, able to be interposed radially between the external jacket of the piston 30 and the internal lining of the cylinder 20.

In practice, the piston 30 subdivides the internal volume of the cylinder 20 into two distinct variable-volume chambers, of which a first chamber, axially delimited by a first head wall 21 and a first face of the piston 30 facing towards the first head wall 21, and a second chamber, axially delimited by a second head wall 22 and a first face of the piston 30 facing towards the second head wall 22.

The piston 30 is for example mobile internally of the cylinder 20 between two opposite end-run positions, in which the piston 30 is in contact respectively with the head walls 21 and 22.

For example, in a first end-run position the volume of the first chamber is substantially minimum and in a second end-run position the volume of the second chamber is substantially minimum.

The piston 30 is, further, switchable into a centered position, in which the volume of the first chamber is substantially equal to the volume of the second chamber and/or the piston 20 is at the axial halfway line of the cylinder 20 (i.e. substantially at half-stroke).

The piston 30 is when necessary blockable, by a pilot circuit (not illustrated) of the vehicle V, in the centered position, as known to the technical expert in the sector.

The piston 30 and in more detail the stem 31 thereof, has a reference mark (or notch) 33 realized at a limited axial portion thereof.

The reference mark 33 is, for example, obtained by laser (incision) machining of the surface thereof, for example made of steel.

The reference mark 33 has a circumferential development that is such as to involve a whole annular zone of the stem 31 and which extends for a predefined axial portion.

For example, the reference mark 33 is defined by a plurality of incisions, for example parallel to one another (and parallel to the longitudinal axis of the stem 31) and equidistant.

For example, the reference mark 33 defines a zone of the stem 31 having a differing surface finish (or color) with respect to the remaining external surface of the stem 31 which has a lower reflectance with respect to the remaining external surface thereof 31.

The cylinder 20 comprises a housing seating 23 (for example passing with a substantially radial through-axis), for example made at one of the head walls 21 or 22, for example the first head wall 21.

In the example the housing seating 23 is for example able to place the external jacket of the head wall 21 or 22 (the first head wall 21) in communication with the respective through-opening 210 or 220, defining a substantially radial conduit.

Alternatively the housing seating 23 can be realized at the cylinder 20, for example in a central zone thereof (for example at the axial halfway point).

For example, the axial position of the housing seating 23 along the longitudinal axis of the cylinder 20 and the reference mark 33 along the longitudinal axis of the piston 30 (i.e. the stem 31) are defined so that when the reference mark 33 is aligned along a radial direction (underlying) the housing seating 23, the piston 30 is in the centered position.

Further, the cylinder 20, for example at both the head walls 21 an 22, comprises a respective inlet/outlet opening 211, 221 of an activating fluid, for example oil, of the piston 30 connectable to the pilot circuit as known to the technical expert in the sector.

The piston-cylinder unit 10 comprises an optical sensor 40, which is for example fixed (solidly) to the cylinder 30, for example housed (coaxially) in the housing seating 23.

The optical sensor 40 comprises, for example, an emitter of light radiations facing towards the piston 30, i.e. towards the stem 31 thereof, i.e. able to direct (along a radial direction defining the optical axis of the optical sensor 40) towards a an axially-delimited portion of the piston 30, i.e. of the stem 31 of the piston, a beam of light radiation.

The optical sensor 40 further comprises, for example, a receiver of light radiations facing towards the piston 30, i.e. towards the stem 31 thereof, i.e. able to receive from the axially-delimited portion of the piston 30, i.e. of the stem 31, a beam of light radiation, for example reflected.

When the light radiations emitted by the emitter of the optical sensor 40 strike the reference mark 33 realized in the stem 31 they are in the majority absorbed so that only a fraction thereof is reflected and is, therefore, detectable by the receiver of the optical sensor 40; when on the other hand the light radiations emitted by the emitter of the optical sensor 40 strike a portion of the stem 31 axially external of the reference mark 33 they are in the majority reflected and directed towards the receiver of the optical sensor 40.

The absolute intensity of the color of the reference mark 33 or the surface of the piston 30 (i.e. the stem 31) not involved by the reference mark 33 is inversely proportional therefore to the intensity of the reflected radiation that reaches the receiver of the optical sensor 40 and enables discriminating whether in the axial zone underlying the optical sensor 40 the reference mark 33 or the surface of the piston 30 (i.e. the stem 31) not involved by the reference mark 33 is transiting or is stationary.

In greater detail, in order to discriminate whether in the axial zone underlying the optical sensor 40 the reference mark 33 or the surface of the piston 30 (i.e. the stem 31) not involved by the reference mark 33 is transiting or is stationary, the optical sensor 40 is able to detect a value of the intensity of the radiation reflected by the surface of the piston (i.e. the stem 31) and received by the receiver and compare it with a minimum threshold, for example a minimum detected threshold provided by the producer of the optical sensor 40, i.e. a design datum provided with the optical sensor 40.

If the measured value of the intensity of the radiation reflected by the surface of the piston 30 is greater than the minimum threshold, it is identified that the axial zone underlying the optical sensor 40 is a piston surface 30 (i.e. of the stem 31) not involved by the reference mark 33, i.e. a light axial zone with high reflectance.

If on the other hand the measured value of the intensity of the radiation reflected by the surface of the piston 30 (i.e. the stem 31) is lower than the minimum threshold, it is identified that the axial zone underlying the optical sensor 40 is the one involved by the reference mark 33, i.e. a dark axial zone with low (or lower) reflectance.

The intensity of the reflected radiation is inversely proportional to the intensity of the color measurable in a decreasing scale from the most intense black to the lightest black.

Once the reference mark 33 is detected by the optical sensor 40, in order to newly read the surface of the stem 31 not involved by the reference mark 33, the optical sensor 40 is configured so that the measured value of the intensity of the radiation reflected by the surface of the piston 30 exceeds a predetermined hysteresis value that is greater than the minimum threshold, so as to avoid having an unstable output signal of the optical sensor straddling the minimum detected threshold.

The optical sensor 40 is for example able to generate an electrical signal, for example a square wave, the amplitude whereof (intensity) is a function (for example proportional) of the intensity of the reflected radiation received by the receiver of the optical sensor 40.

The piston-cylinder unit 10 comprises an electronic control unit 50, which is operatively connected to the optical sensor 40, for example for receiving and processing the electric signal emitted by the optical sensor 40 and is provided with a memory 55.

For example, the electronic control unit 50 can be integrated in the optical sensor 40 or be connected thereto, for example electrically, in a cabled or wireless way.

The electronic control unit 50 can be a microchip.

For example, the electronic control unit 50 can be operatively connected or integrated with the electronic control unit of the vehicle V.

The electronic control unit 50 is for example configured for determining the centered position of the piston 30 in the cylinder 20 when the optical sensor 40 detects that the reference mark 33 transits or stations in the axial zone extending below the optical sensor 40.

The electronic control unit 50 is further configured for running a verification procedure of the detectability of the reference mark 33 with respect to the remaining surface of the piston 30, i.e. of the stem 31.

The verification procedure can include the electronic control unit 50 monitoring, i.e. periodically controlling, an indicative parameter of the color (i.e. the degree of reflectance) of the reference mark 33.

In the example, the indicative parameter of the color of the reference mark 33 is the intensity of the radiation reflected by the surface of the reference mark 33.

Alternatively or in addition, the indicative parameter of the color of the reference mark 33 can be the intensity of the color of the reference mark 33 or a value of a chromatic contrast between the color of the reference mark 33 and a reference color (for example a calibration white) or a value of a chromatic contrast between the color of the reference mark 33 and the color of the portion of stem 31 not involved by the reference mark 33.

In particular, the electronic control unit 50 is configured for periodically determining (block S1), on the basis of a measurement of the optical sensor 40, a value of the indicative parameter of the color of the reference mark 33.

To do this, for example, in a case where the indicative parameter of the color of the reference mark 33 and the intensity of the radiation reflected from the surface of the reference mark 33 when the reference mark 33 is in the area extending below the optical sensor 40, the electronic control unit 50 is configured for measuring via the optical sensor 40 a value of the intensity (absolute or relative) of the radiation reflected from the surface of the reference mark 33.

Once the value of the intensity of the radiation reflected from the surface of the reference mark 33 has been measured, the electronic control unit 50 is configured for comparing (block S2) the measured value with at least a predetermined threshold value thereof.

For example, the threshold value is experimentally determined and is stored in the memory 55.

The threshold value is for example determined so as to be in any case different to the minimum value, i.e. lower than the minimum detected threshold.

If the measured value of the intensity of the radiation reflected from the surface of the reference mark 33 becomes equal to or higher than the threshold value thereof (and therefore comprised between the threshold value and the minimum value), the electronic control unit 50 is configured for emitting (block S3) an alarm signal perceptible to a driver of the vehicle V.

For example, the alarm signal is of a sensor signal type, for example visual and/or acoustic and/or tactile, and is emitted by the user interface I (i.e. the signaling element L), which is operatively connected to the electronic control unit 50 for receiving the alarm signal and activating the signaling element L in response to the alarm signal received.

For example, the electronic control unit 50 could be configured for comparing (block S2) the measured value of the intensity of the radiation reflected from the surface of the reference mark 33 with a plurality of the threshold values, for example growing, i.e. which converge towards the minimum threshold.

Each threshold value can be experimentally determined and is stored in the memory 55.

The threshold value is for example determined so as to be in any case different to the minimum value, i.e. always lower than the minimum detected threshold.

The electronic control unit 50 might therefore be configured for emitting a plurality of alarm signals, for example differentiated from one another, as a function of the threshold value that is progressively exceeded by the measured value of the intensity of the color of the reference mark 33.

For example, if the measured value of the intensity of the radiation reflected from the surface of the reference mark 33 becomes equal to or higher than a first threshold value thereof (the lowest of all), the electronic control unit 50 can be configured for emitting (block S3) an alarm signal of an early warning type perceptible to a driver of the vehicle V; if the measured value of the intensity of the radiation reflected from the surface of the reference mark 33 becomes equal to or higher than a second threshold value thereof higher than the first threshold value, the electronic control unit 50 can be configured for emitting (block S3) an alarm signal of a second warning type (for example more intense than the early warning) perceptible to a driver of the vehicle V; if the measured value of the intensity of the radiation reflected from the surface of the reference mark 33 becomes equal to or higher than a third threshold value thereof higher than the second threshold value, the electronic control unit 50 can be configured for emitting (block S3) an alarm signal (for example more intense than the second warning) perceptible to a driver of the vehicle V.

For example, the alarm signal emitted by the electronic control unit 50 can be a signal having an intensity or having a level that is inversely proportional to the distance of the measured value (indicative of the intensity of the radiation reflected by the reference mark 33) from the minimum threshold of the optical sensor 40, i.e. the smaller the distance of the measured value (for example as a function of the threshold value exceeded) from the minimum threshold, the greater the level or intensity of the alarm signal perceived by the driver.

In addition, when the measured value of the intensity of the radiation reflected from the surface of the reference mark 33 is comprised between the threshold value (any threshold value) and the minimum threshold (for example higher than or equal to the threshold value), the electronic control unit 50 can, further, be configured for estimating (block S4) a residual time of use or a number of residual strokes (of the piston 30) of the piston-cylinder unit 30 following the emitting of the alarm signal and including a scalar magnitude in the alarm signal, for example a time indication or a progressive number that is progressively decreasing or the like, indicative of the time of use or the number of residual strokes.

For example, the electronic control unit 50 can estimate the time of use or the number of residual strokes on the basis of a gradient of the chromatic contrast over time.

In practice, the electronic control unit 50, by monitoring the value of the indicative parameter of the color or the reference mark 33, for example the intensity of the radiation reflected by the surface of the reference mark 33, during the use (from the first start-up of the piston-cylinder unit 10) can define the decay (or progressive lack of clarity) which the reference mark 33 is undergoing during the use of the piston-cylinder unit 10 and estimate, therefore, the time of use or the number of residual strokes that remains between the moment at which the value of the intensity of the radiation reflected by the reference mark 33 (from lower values) reaches the predetermined threshold value thereof and the moment at which the reference mark 33 is no longer distinct from the optical sensor 40, i.e. the moment at which the measured value of the intensity of the radiation reflected by the surface of the reference mark 33 reaches the minimum threshold provided by the optical sensor 40.

Alternatively or in addition, the electronic control unit 50 can estimate the time of use or the number of residual strokes on the basis of a gradient of the time gradient of the intensity of the radiation reflected by the surface of the reference mark 33.

In practice, the electronic control unit 50, by monitoring the value of the indicative parameter of the color or the reference mark 33, i.e. the intensity of the radiation reflected by the surface of the reference mark 33, during the use over time (from the first start-up of the piston-cylinder unit 10) can define the time of decay (or progressive lack of clarity) which the reference mark 33 is undergoing during the use of the piston-cylinder unit 10 and estimate, therefore, the time of use or the number of residual strokes that remains between the moment at which the value of the intensity of the radiation reflected by the reference mark 33 (from lower values) reaches the predetermined threshold value thereof and the moment at which the reference mark 33 is no longer distinct from the optical sensor 40, i.e. the moment at which the value of the intensity of the radiation reflected by the surface of the reference mark 33 reaches the minimum threshold thereof.

In practice, it has been observed that as the piston-cylinder unit 10 is gradually used, for example in a muddy or dusty environment, the wear (for example by scratching) of the reference mark 33 leads to a progressive "bleaching", i.e. it progressively increases the reflectance thereof.

The electronic control unit 50 is such as to monitor this "bleaching" with respect to the remaining surface of the piston 30, i.e. of the stem 31, and to send an alarm signal to the driver of the vehicle (or in any case the user of the piston-cylinder unit 10) when the "bleaching" is approaching (not having already reached it) the limit of detectability of the reference mark 33 by the sensor 30. In practice, the driver is informed that the piston-cylinder unit 10 is still operative in a correct way and in complete safety, for example still for a determined use time or number of residual strokes, after which the piston-cylinder unit 10 can be taken to a service and maintenance center for a re-establishing of the initial operating conditions, compatibly with the most stringent standards in the sector.

The invention as it is conceived is susceptible to numerous modifications, all falling within the scope of the inventive concept.

Further, all the details can be replaced with other technically-equivalent elements.

In practice the materials used, as well as the contingent shapes and dimensions, can be any according to requirements, without forsaking the scope of protection of the following claims.

The invention claimed is:

1. A method for detecting a reciprocal position between a cylinder (20) and a piston (30) of a piston-cylinder unit (10) of a vehicle (V), wherein the method comprises steps of:
   measuring, by means of an optical sensor (40), a value of an intensity of a color of a reference mark (33) positioned on a portion of the piston (30);
   comparing the measured value with at least a predetermined threshold value thereof different to a minimum detected threshold of the intensity by the optical sensor; and
   emitting an alarm signal perceptible by a driver of a vehicle (V) if the measured value is comprised between the threshold value and the minimum value.

2. The method of claim 1, further comprising:
   estimating a time of use or a number of residual strokes of the piston-cylinder unit (10) following the emitting of the alarm signal; and
   including in the alarm signal a scalar magnitude indicative of the time of use or the number of residual strokes.

3. The method of claim 1, wherein the alarm signal is a sensor signal emitted by a user interface (I), the signal being a visual signal; an acoustic signal; a tactile signal; or combinations thereof.

4. A piston-cylinder unit (10) of a vehicle (V), comprising a cylinder (20), a piston (30) and an electronic control unit (50), the piston-cylinder unit (10) configured for:
   measuring, by means of an optical sensor (40), a value of an intensity of a color of a reference mark (33) positioned on a portion of the piston (30);
   comparing the measured value with a threshold value thereof different to a minimum detected threshold of the intensity by the optical sensor; and
   emitting an alarm signal perceptible by a driver of a vehicle (V) if the measured value is comprised between the threshold value and the minimum value.

5. The piston-cylinder unit of claim 4, wherein the electronic control unit (50) is configured for:
   estimating a time of use or an indicative number of residual strokes of the piston-cylinder unit (10) following the emitting of the alarm signal; and
   including in an alarm signal a scalar magnitude indicative of the time of use or of a residual number of strokes.

6. The piston-cylinder unit of claim 4, wherein the optical sensor (40) is fixed to the cylinder (20).

7. The piston-cylinder unit of claim 4, wherein the reference mark (33) is positioned on a stem (31) of the piston (30) configured to project axially from the cylinder (20).

8. The piston-cylinder unit of claim 4, wherein the alarm signal is a sensor signal emitted by a user interface (I), the signal being a visual signal; an acoustic signal; a tactile signal; or combinations thereof.

9. The piston-cylinder unit of claim 8, wherein the user interface (I) is located in a command compartment (D) of the vehicle (V).

* * * * *